A. SWINDLER.
WRITING MACHINE FOR THE USE OF THE BLIND.
APPLICATION FILED AUG. 12, 1909.

977,237.

Patented Nov. 29, 1910.

Witnesses
Frank A. Fahle
Thomas W. McMeans

Inventor
Albert Swindler
By Bradford & Hood,
Attorneys

A. SWINDLER.
WRITING MACHINE FOR THE USE OF THE BLIND.
APPLICATION FILED AUG. 12, 1909.

977,237.

Patented Nov. 29, 1910.

Witnesses
Frank A. Fahle
Thomas W. McMeans

Inventor
Albert Swindler,
By Bradford & Hood,
Attorneys.

UNITED STATES PATENT OFFICE.

ALBERT SWINDLER, OF BROWNS VALLEY, INDIANA.

WRITING-MACHINE FOR THE USE OF THE BLIND.

977,237.

Specification of Letters Patent. Patented Nov. 29, 1910.

Application filed August 12, 1909. Serial No. 512,574.

*To all whom it may concern:*

Be it known that I, ALBERT SWINDLER, a citizen of the United States, residing at Browns Valley, in the county of Montgomery and State of Indiana, have invented certain new and useful Improvements in Writing-Machines for the Use of the Blind, of which the following is a specification.

There are at the present time three recognized and well known systems of producing raised characters for conveying information to the blind. The "New York point" is produced by various arrangements of raised or embossed points arranged in two vertically alined horizontal series in groups not exceeding four points horizontally. The "Braille" system is very similar except that the characters are formed by points arranged in groups which do not exceed two points horizontally but which may extend to three points vertically. This "Braille" system is written in two ways. In one of these, the more modern, the letters are uniformly spaced, irrespective of the horizontal dimensions of the letters, so that, between each two letters the spacing will be uniform. In the other, the "Regular Braille", each letter occupies a uniform space irrespective of its horizontal extent, so that a letter of only one point horizontally will occupy as much space as a letter of two points horizontally, thus making the spacing regular. The third system is known as "Moon script" and consists of groups of points arranged in groups to approximate, to some extent, the ordinary Latin characters and in this system the letters may be three points high and from one to five wide.

The object of my present invention is to produce a machine by means of which a strip of paper or other suitable material may be embossed with characters written in any one of the three systems mentioned, the construction being such that the machine may be readily adjusted, for any one of the three systems.

The further object of my invention is to provide a spacing mechanism of such character that the "Braille" system may be written in either one of its forms, the mechanism operating automatically to produce either uniform spacing between letters or irregular spacing between letters.

A further object of my invention is to provide means to facilitate the correction of errors in the product of the machine; and to produce such improvements in details of construction as shall be hereinafter pointed out.

The accompanying drawings illustrate my invention: Fig. 3 an elevation of the spacing elevation; Fig. 3ᵃ a section detailed on an enlarged scale of the paper spacing lever and connected parts; Fig. 4 an elevation of the opposite end of the machine; Fig. 5 a section on an enlarged scale, and full size on line 5 5 of Fig. 1; Fig. 5ᵃ a fragmentary detail of a portion of the parts shown in Fig. 5 showing the position of the parts for writing "New York point", the same parts in Fig. 5 being shown in the position for writing "Braille" and "Moon"; Fig. 6ᵃ a fragmentary detail of parts shown in Fig. 6 adjusted in the relation shown in Fig. 5ᵃ; Figs. 13, 14 and 15 are sections on line 15 15 of Fig. 16; Fig. 19 a longitudinal sectional detail of the paper spacing ratchet, and Fig. 20 a section on line 20 20 of Fig. 19.

Figures 4, 19, 20:
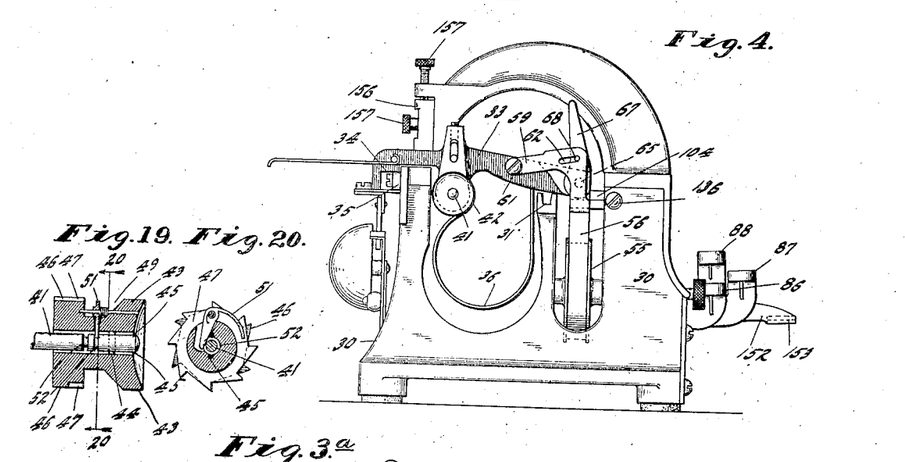

In the drawings 30 indicates a suitable frame work having a runway 31 in which are mounted rollers 32 carried by the paper carriage 33, said paper carriage also having a runway 34 resting upon rollers 35 carried by frame 30, the construction being similar to the well known typewriter constructions, by means of which the paper carriage 33 may have a longitudinal travel on the main frame. Carriage 33 is provided with a pocket 36 adapted to receive a roll of paper 37, suitable to be operated upon, said paper being carried between a pair of feed rolls 38 and 39, mounted upon carriage 33. Roller 38 is carried by a shaft 41, one end of which is provided with a knurled head 42 by means of which the shaft may be rotated. The opposite end of shaft 41 is provided with a knurled head 43 which is splined upon shaft 41 by means of a pin 44 carried by the shaft and projected into keyways 45 (Fig. 19). Head 43 is provided with two ratchet wheels 46 and 47 which may be conveniently formed integral but which have different numbers of teeth so that the amount of rotation produced upon roller 40 by means of the spacing lever 48 may be varied to correspond with the system of embossing which is being produced by the machine.

In order to readily adjust head 43 so as to bring one or the other of the ratchet wheels 46 and 47 into alinement with the spacing lever 48, I form a circumferential groove 49 in head 43 and mount therein a small spring dog 51 the inner end of which is projected into the interior head 43 so that it may be brought into either one of two circumferential grooves 52 formed in shaft 41, (as clearly shown in Figs. 19 and 20,) and thus hold the head 43 and the ratchet wheels 46 and 47 carried thereby, against axial movement.

The spacing lever 48 is provided at one end with a finger piece 53, by means of which it may be easily operated, and at the opposite end is provided with a spring dog 54 adapted to engage the teeth of either ratchet 46 or 47. Carriage 33 is normally urged in one direction by means of a usual spring drum 55 connected with the carriage by means of a tape 56, and in order to hold the carriage against the action of the drum 55, I mount upon the carriage, the spacing bar 57 which is provided with a plurality of uniformly spaced notches 59 adapted to coöperate with the spacing dogs to be described.

Figures 5, 5A:
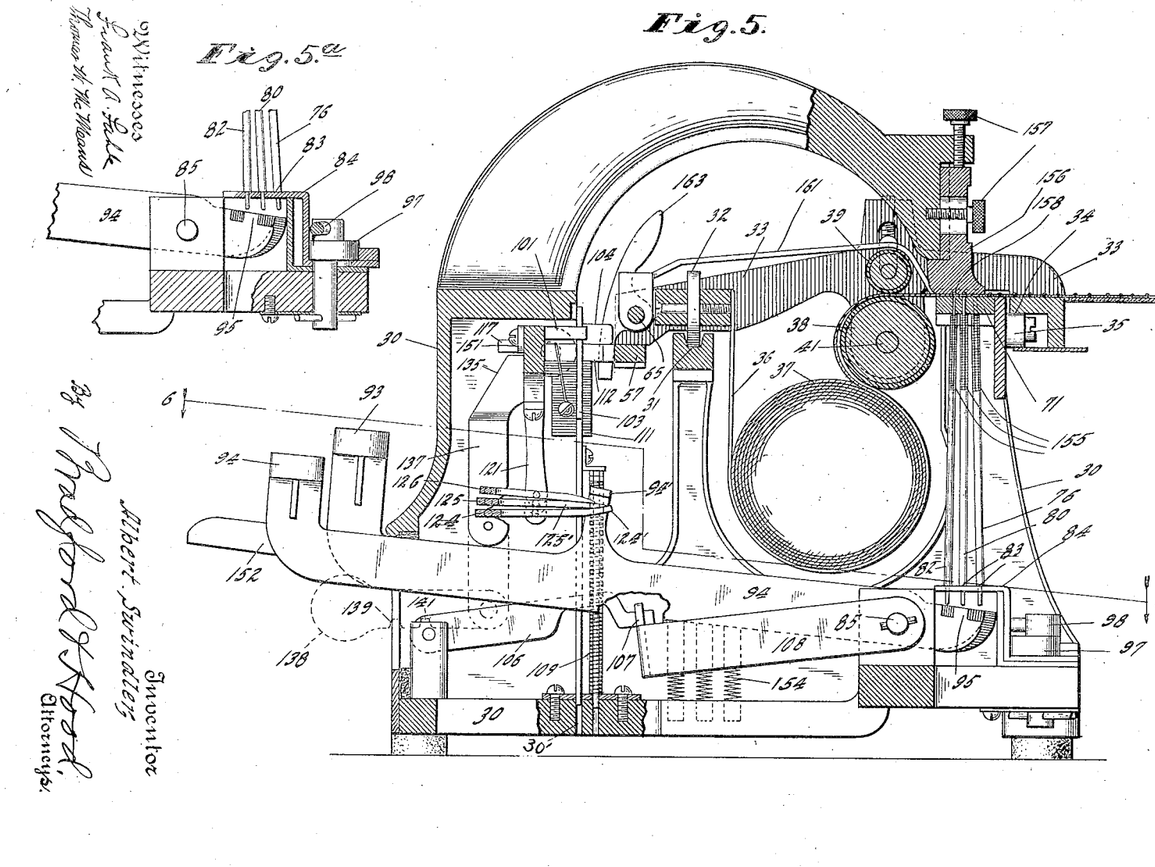

In order that the carriage may be automatically released for movement in either direction when the paper is spaced forwardly, bar 57 is carried by a pair of brackets 59 which are pivoted at 61 to the end bars of the carriage 33, and each of these brackets is provided with a slot 62 arranged to receive the pin 63 carried by a cam 64 mounted upon a shaft 65, which is normally urged in one direction by means of a spring 66, the spring serving to normally retain bar 57 in the position shown in Fig. 5.

Figure 3:
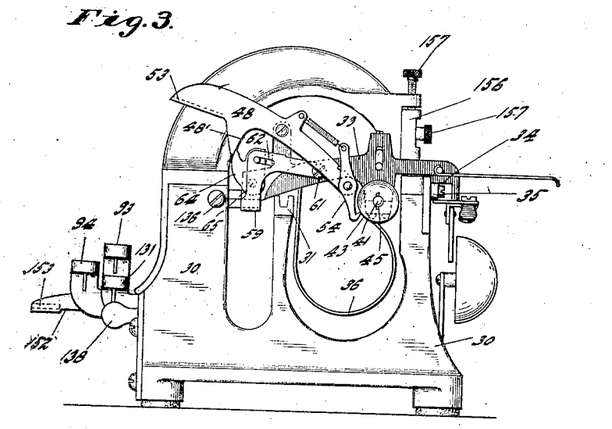
Fig. 3 an elevation of the spacing lever end of the machine.
Figure 3A:
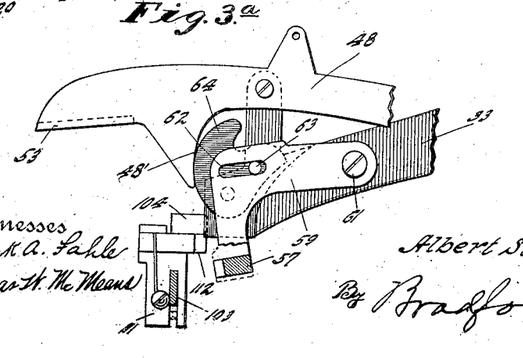

Cam 64 is arranged beneath a cam shoulder 48' formed on the spacing lever 48 so that, by depressing the spacing lever 48 the cam shoulder 48' will engage cam 64 and rotate it to the position shown in Fig. 3ª, thus driving bar 57 downwardly away from the spacing dogs. In order that the shaft 65 may be rotated from either end so as to release the carriage, I secure, to that end opposite spacing lever 48, a lever 67 provided with a pin 68 lying within groove 62 of the adjacent bracket 59.

Figure 6:
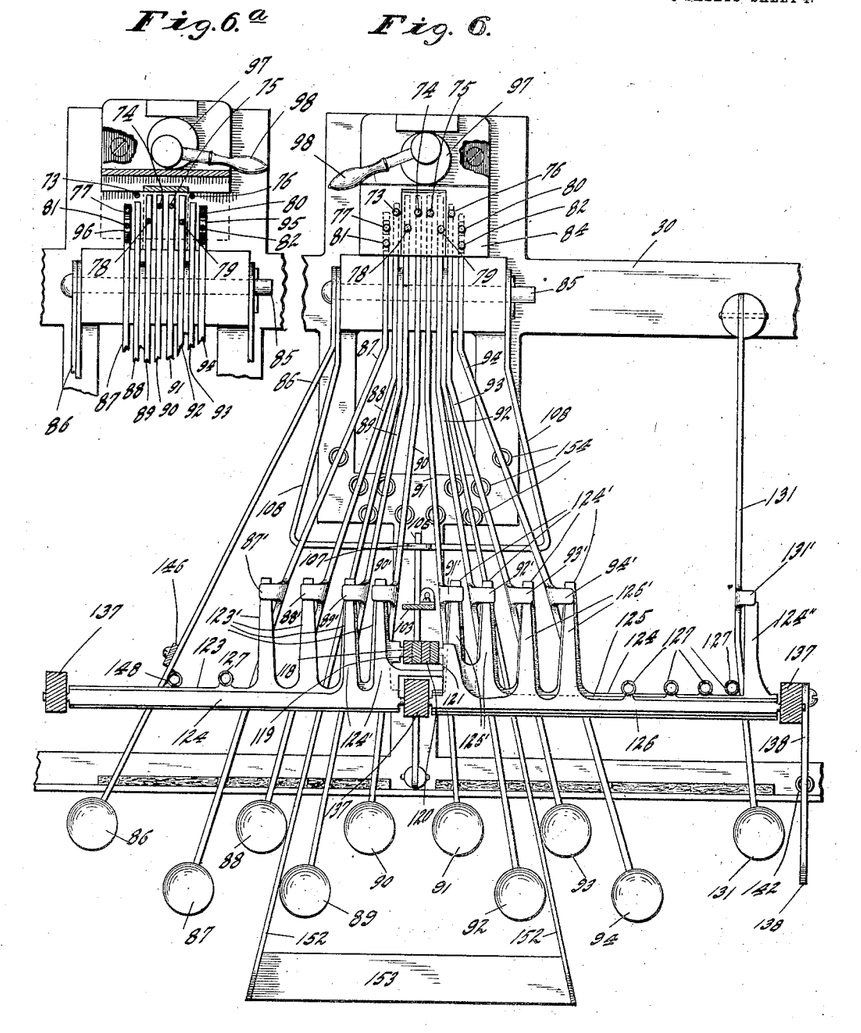
Fig. 6 a section on line 6 6 of Fig. 5.
Figure 7:
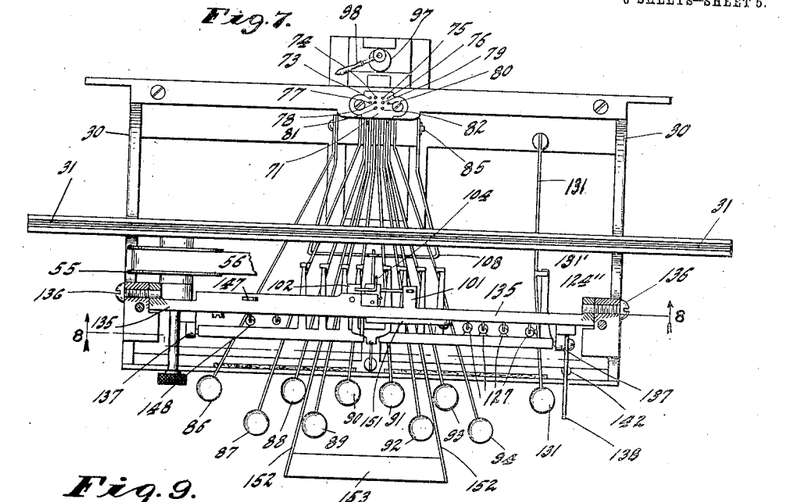
Fig. 7 a horizontal sectional plan of the machine with the paper carriage and die omitted.

Frame 30, at a point beneath the travel of the paper 37, after it has issued from the feed roll 38, is provided with a guide block 71, which is provided with a plurality of perforations in which are mounted a plurality of punches 73, 74, 75 and 76 arranged in a series parallel with the line of movement of the carriage; also a series of plungers 77, 78, 79 and 80, also arranged in a series parallel with the line of movement of the carriage and in alinement, transversely of the line of movement of the carriage, with the series 73 to 76; also two plungers 81 and 82 arranged in a line parallel with the line of movement of the carriage, with plunger 81 in transverse alinement with plungers 74 and 78 and plunger 82 in transverse alinement with plungers 75 and 79. Plungers 73 and 76 at their lower ends are spread away from the plungers 74 and 75 in the line of movement of the carriage, as indicated in Fig. 6. Plungers 77 and 80 are spread at their lower ends to points beyond plungers 73 and 76 respectively and plungers 78 and 79 are spread at their lower ends to points between (but out of alinement of) plungers 73—74 and plungers 75—76, respectively. Plungers 77 and 80 are spread at their lower ends to points beyond plungers 73 and 76 respectively, and plungers 81 and 82 are spread at their lower ends so as to come into transverse alinement with plungers 77 and 80 respectively, and the lower ends of the various plungers are reduced to form shoulders 83 (Fig. 5ª) and the reduced ends projected downwardly through suitable openings formed in a plate 84.

Pivoted upon a pivot pin 85 are key levers 86, 87, 88, 89, 90, 91, 92, 93 and 94, the outer end of each of which is provided with a suitable finger piece by means of which it may be readily operated. The finger piece ends of the several levers are suitably spread so as to afford sufficient room for operation but at their inner ends the several levers are brought into parallelism and closely compacted. The inner end of key 87 lies beneath the lower ends of plungers 77 and 81, key 88 beneath plunger 73, key 89 beneath plunger 78, key 90 beneath plunger 74, key 91 beneath plunger 75, key 92 beneath plunger 79, key 93 beneath plunger 76 and key 94 beneath plungers 80 and 82. It will be seen from the above that plungers 74, 75, 78 and 79 may be used either in the "New York point," "Braille" or "Moon" systems but that, for the "New York point" system plungers 81 and 82 cannot be used, while they are used for the "Braille," and that plungers 73, 76, 77 and 80 cannot be used for the "Braille" system.

In order, therefore, not to require an unnecessary number of finger keys in order to adapt the machine for use with either of the systems, I make the plate 84 movable longitudinally of the inner ends of the keys (transversely of the line of movement of the paper carriage) so that by shifting said plate the lower ends of the plungers may be shifted relatively to the keys. The inner ends of keys 88 and 93 are then made somewhat shorter than the inner ends of the keys 89, 90, 91 and 92, (see Figs. 6 and 6ª) so that, when the plate 84 is shifted to the position shown in Fig. 6ª, the lower ends of plungers 73 and 76 will be carried out beyond the ends of the keys 88 and 93 respectively, so that said keys will become inoperative so far as their plungers are concerned. For like reason the inner end of key 94 is provided with a plunger-engaging toe 95 (Fig. 5) of such limited extent that it cannot possibly engage more than one of the plungers 80 and 82 which are in alinement with the inner end of the key 94, so that, when the plate 84 is in the position shown in Fig. 6, plunger 80 will be in position to be actuated and when the plate is in the positon shown in Fig. 6ª, plunger 82 will be in position to be actuated, by key 94. Similarly key 87 is provided with a toe 96 which is arranged to have either plunger 77 or plunger 81 brought into position to be engaged thereby.

Plate 84 may be shifted into either of its positions by a half rotation of cam 97 which is provided with a suitable operating handle 98.

Arranged on bar 135 (to be described later) is a guide 101, and a sliding bar 100 which carries a guide 102. Projected into guides 101 and 102 are guiding fingers of a vertically reciprocable dog plate 103 which carries a fixed dog 104 adapted to coöperate with the space bar 58 and to be moved into and out of the notches thereof by a vertical movement which carries the dog into and out of the plane of the catch bar. The dog plate 103 is extended at its lower end into a guideway 30' and at an intermediate point is provided with a notch 105, in which rests an operating lever 106, the rear end of which is connected at 107 with a yoke 108, pivoted upon pin 85 and extended beneath all of the levers 87 to 94 inclusive. Dog plate 103 is normally urged upwardly by means of a spring 109. Slidably mounted upon dog plate 103 and movable in the line of movement of the paper carriage, is a dog carrier 111 upon which is mounted a swinging dog 112 which may be brought into vertical alinement with dog 104 by the action of the paper carriage, or may be shifted to the position shown in Fig. 12, or an intermediate point, by means of a light spring 113 (see dotted lines Fig. 11). The dog carrier 111 is guided by its engagement with the dog plate 103 and is also provided with a guiding tail 114 projected through an extension 115 on a plate 103 (see Fig. 17).

In any of the systems the space occupied by any particular letter will depend upon the number of horizontal points used in its production and, in order that there may be a movement of the paper carriage in accordance with the number of horizontal points used in any letter, the movement of dog 112 relative to dog 104 must be gaged in accordance with the particular plungers which may have been used in the production of the letter. For this purpose I provide the following mechanism. The dog carrier 111 is, by the force of drum 55 and the action of paper carriage 33 thereon, normally held in engagement with a shoulder 116 (see Fig. 13) and said dog carrier is provided with a projection 117 below which are arranged a series of spacer blocks 118, 119, 120, and 121, the thickness of which corresponds to the distance between two notches 58 in the spacer bar 57. The first of these spacer blocks 118 lies a distance from the normal position of projection 117 substantially equal to the distance between two notches 58 of the spacer bar 57, so that when the dog plate 103 is drawn downwardly and dog 112 is thereby withdrawn from engagement with the teeth of spacer bar 57 and dog 104 is thrown into engagement with said teeth, dog carrier 111 will be shifted, by its spring 113, the distance of one space 58, the projection 117 coming into engagement with spacer block 118 and being stopped thereby so that, when the dog plate 193 rises, dog 112 will enter a notch 58 next succeeding that into which dog 104 has been projected, thus permitting the paper carriage to advance one step so soon as dog 104 has been withdrawn. Similarly, by withdrawing the spacer blocks 118 to 121 inclusive, some or all of them, the amount of movement of the dog carrier 111 may be varied so as to permit the paper carriage to advance from one to five steps at a single movement, thus providing for the production of a character occupying from one to four horizontal points and automatically providing for a uniform space between the character irrespective of the number of horizontal points occupied thereby.

Figures 11, 12, 15, 16, 17:
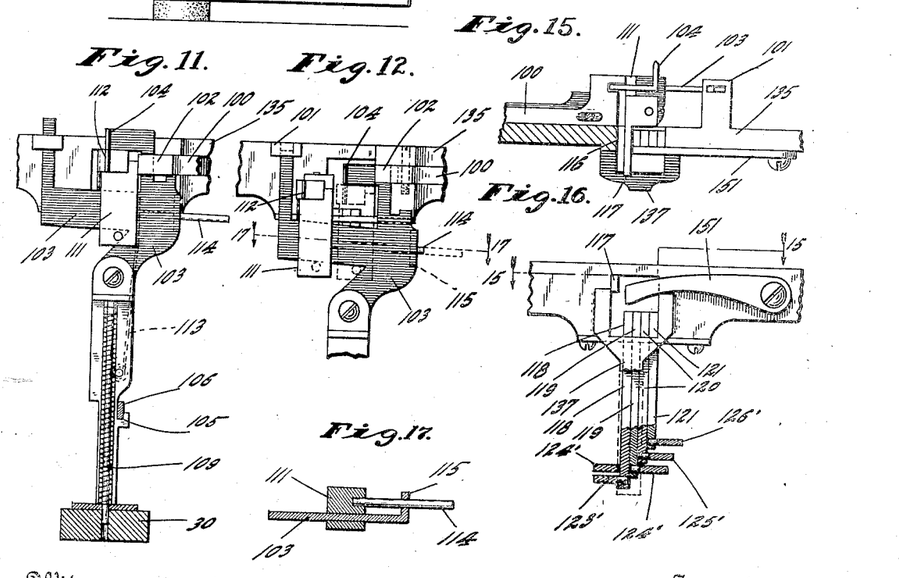
Fig. 11 a rear elevation of the spacer in normal position.
Fig. 12 a similar view showing the parts in spacing position, the spacing dog being moved to its greatest extreme.
Fig. 15 a plan of the parts in normal position, when adjusted for "Moon" script.
Fig. 16 a fragmentary detail showing the connection between the controller bars and the spacer blocks.
Fig. 17 a section on line 17 17 of Fig. 12.
Figure 18:
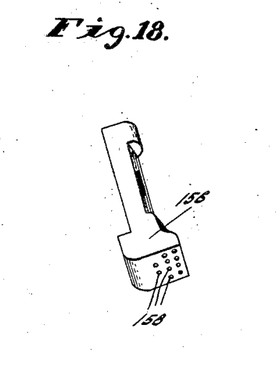
Fig. 18 a perspective detail of the die.

In order that the withdrawal of the spacer blocks 118 to 121 inclusive may be entirely automatic I provide a plurality of controller bars 123, 124, 125 and 126, each of which is normally held by one of a series of springs 127. The keys 87 to 94 inclusive are each provided with overhanging fingers 87′ to 94′ inclusive respectively and the controller bar 123 is provided with four fingers 123′ which are projected beneath the overhanging fingers 87′, 88′, 89′ and 90′. Similarly controller bar 124 is provided with a plurality of fingers 124′ which are projected beneath the fingers 91′, 92′, 93′ and 94′. Controller bar 125 is provided with two fingers 125′ which over lie those fingers 124′ which project beneath fingers 91′ and 92′ but are somewhat shorter than said fingers, for a reason which will appear. Controller bar 126 is provided with two fingers 126′ which overlie those fingers 124′ which lie beneath projections 93′ and 94′ but are substantially of the length of fingers 125′ and shorter than fingers 124′. Bar 126 is connected to the spacer block 121, bar 125 to spacer block 120, bar 124 to spacer block 119, and bar 123 to spacer block 118 (Figs. 5, 6 and 16).

For producing characters of the "Braille" system with a uniform space for each letter, it is necessary to produce a uniform movement of the carriage irrespective of the keys which may be operated and for this reason I provide bar 124 with a finger 124″ which may be engaged by a projection 131′ on a key 131 which may be locked down by throwing it under a shoulder 132 (Fig. 2) thus drawing down the two spacer blocks 118 and 119 and keeping them down throughout the entire operation of the machine, so that any operation of the dog plate 103 will permit a three space movement of dog carrier 111 and dog 112 carried thereby.

The entire spacing mechanism is carried upon bar 135 pivoted at 136 (dotted lines Fig. 10) on an axis parallel with the line of movement of the paper carriage and provided with depending arms 137 at its ends and middle to support the controller bars. This pivotal mounting of the spacing mechanism is advisable in order that the fingers of the controller bars 124, 125, and 126 may be drawn back from under the projections 87′ to 94′ inclusive, when the machine is to be used for producing "Braille system" which requires but two points horizontally in the production of any letter. For the purpose of producing this withdrawal I provide a latch 138 connected at one end with one of the depending arms 137 and projected outwardly from the front of the casing 30. Latch 138 is provided with two notches 139 and 141 (dotted lines Fig. 10) which serves to hold the latch in either one of its two positions and said latch is urged downwardly by a light spring 132.

Figure 1:
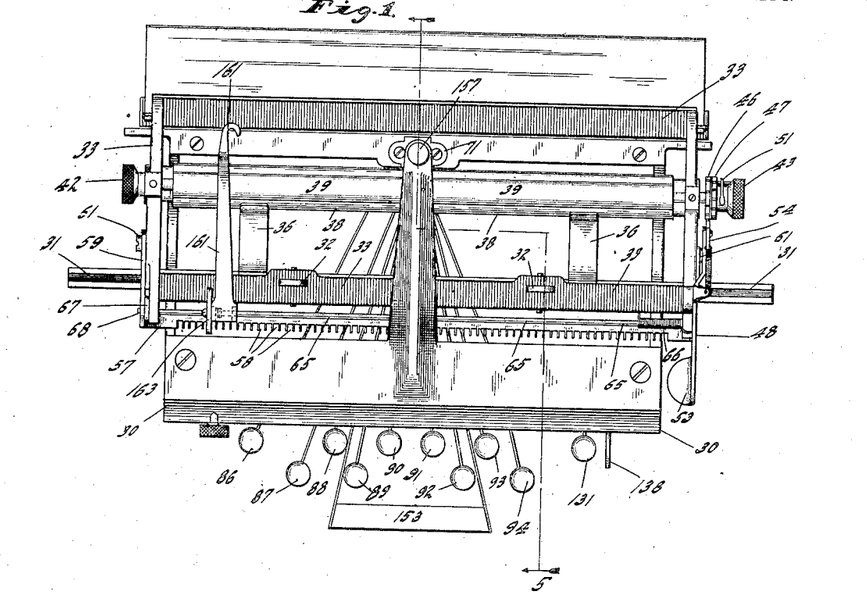
—Figure 1 is a plan of a machine embodying my invention.
Figure 2:
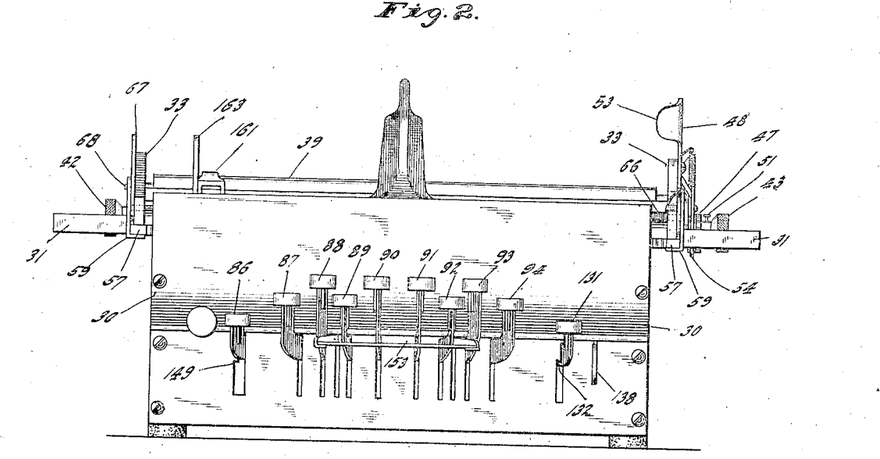
Fig. 2 a front elevation.
Figures 8, 9:
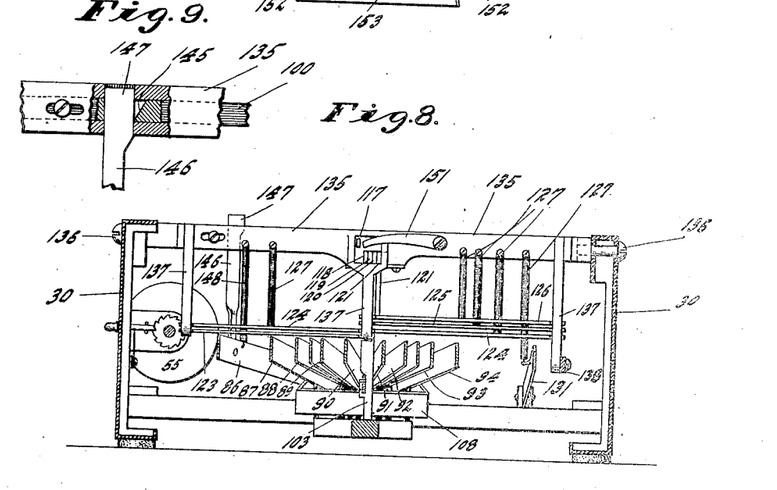
Fig. 8 a section on line 8 8 of Fig. 7.
Fig. 9 a detail of a portion of the adjusting mechanism for setting the machine to write "Moon" script.

To produce characters according to the "Moon" system it becomes necessary to control the movement of the carriage so as to produce characters three points high and three or more points wide and in order to do this, plate 84 is set as it would be for writing according to the "Braille" system but it is necessary that there be no automatic spacing action of the paper carriage upon the actuation of those keys which control the plungers 74, 75, 78, 79, 81 and 82. For that reason bar 100 needs to be shifted to the right (Fig. 13) to the position shown in Fig. 15 so that projection 117 is brought closely adjacent spacer block 118 thereby preventing any movement of dog 112 in the line of movement of the upper carriage until block 118 has been withdrawn. For the purpose of producing this movement of bar 100 and holding the same in its shifted position, I provide said bar with a transverse cam slot 145 (Fig. 9) through which is projected a slide 146 provided with an enlarged end 147. Slide 146 is connected to a key 86 which is normally held up by a spring 148 but may be locked down by being carried under a shoulder 149 (Fig. 2). When the parts are in this position of adjustment, it is necessary to prevent movement of dog carrier 111 until the projection 117 has been brought below the top of spacer block 118 and for this purpose I provide a pawl 151, the free end of which is brought to the vertical plane of the initial face of block 118, as clearly shown in Fig. 16, said pawl yielding upwardly whenever projection 117 has been carried beneath it and is on its return movement to normal, as the paper carriage advances.

In order to produce a spacing between words I pivot upon pin 85 a pair of arms 152 which extend out beyond the keys and are connected by a bar 153, the levers 152 projecting above yoke 108 so as to operate against it in exactly the same way as the various keys. The spacing key and the other keys 87 to 94 inclusive are each normally held in their upper position by suitable springs 154, and the several plungers 73 to 82 inclusive are normally urged downwardly so as to be retracted from the upper face of guide block 71, by means of light springs 155.

Arranged above guide block 71 is an anvil or die 156 which may be adjusted toward and from the face of block 71, and hence toward and from the upper face of the paper 37, by means of suitable adjusting screws 157. The block 156 is provided on its anvil face with suitable pockets or depressions 158 into which the paper may be pushed by the plungers.

It often occurs that the operator will have failed to produce a proper character and I have therefore provided means by which a correction can be readily made. The operator having discovered an error, will place a finger of one hand upon the point of error and then with the other hand will bring to position a pointer 161. the free end of which overlies the line of characters which has just been produced, so that the pointer thereof will lie opposite the erroneous character. The marker 161 is slidingly mounted upon the shaft 65 of the paper carriage and is held in any desired position by means of a pawl 163, the free end of which may be swung into any one of the notches 58. If the only correction desired is the addition of one or more points to the character the operator then has merely to move the carriage backward until pawl 163 engages guide 102 at which point the erroneous character will have been brought to proper position to lie immediately upon the character-forming plungers, whereupon the additional points may be added to the character. If, however, too many points have been produced in the erroneous character, the operator may, with a blunt instrument press down the points of the erroneous character, using the pointer 161 as a gage, and return the paper to position to receive a proper impression, whereupon the pointer is returned to its normal position at the extreme left hand end of the carriage.

If the operator desires to produce characters in the "New York point" system he will first swing lever 98 to the position shown in Fig. 6, thus making available plungers 73 to 80 inclusive, i. e. two horizontal rows of four points each, thus making four vertical rows of two points each and all of the keys 87 to 94 inclusive will be used in such combination as may be desired to produce the proper characters, projecting the plungers upwardly into the paper in a well known manner. At the same time latch 138 will be moved to the position shown in Fig. 5 where all of the fingers of the controller bars are in position to be engaged by the overhanging portions of the respective keys.

With the parts in these positions a depression of either of keys 87 and 88 will swing the controlling bar 123 and thus cause the withdrawal of the spacer block 118 and permit a forward movement of the paper carriage of two spaces one to compensate for the character formed by one or both of the plungers 73 and 77 and one to provide for the space between the character and the next succeeding character. A depression of either of keys 89 or 90 will actuate controller bar 124 which, because its fingers overlie the fingers of controller bar 123, will cause a withdrawal of spacer blocks 118 and 119, thus permitting a three space movement of the paper carriage. An actuation of either of keys 91 or 92 will act upon controller bar 125 and consequently upon controller bar 126 and thus upon all of the preceding controller bars, thereby retracting all of the spacing blocks 118 to 121 inclusive and permitting a five space movement of the paper carriage. With this adjustment, plungers 81 and 82 are in position where they cannot be actuated by any of the keys.

Figures 10, 13, 14:
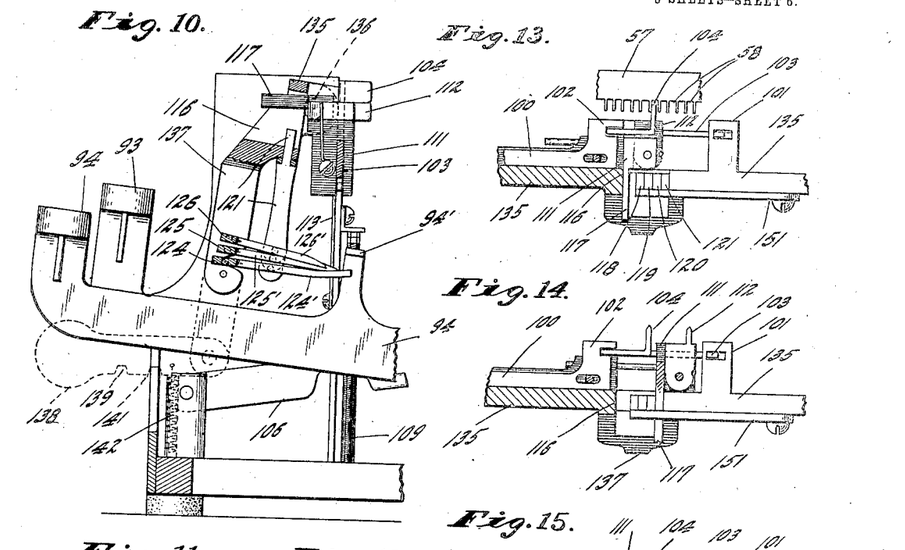
Fig. 10 a fragmentary detail showing the adjustment of the spacing mechanism for writing uniformly spaced "Braille"
Fig. 13 a plan of the spacing dogs and adjacent parts in normal position.
Fig. 14 a similar view showing the movable spacing dog moved to its greatest extreme.

In order to produce characters in accordance with the "Ideal Braille" system the operator will pull latch 138 to the position shown in Fig. 10, thus withdrawing the fingers of controller bars 125 and 126 from beneath the projections of their respective keys and leaving only the fingers of controller bars 123 and 124 in position. The operator will also swing handle 98 to the position shown in Fig. 6ª, thus throwing plungers 81 and 82 into commission and plungers 73, 76, 77 and 80 out of commission in the manner already described. The paper feed will be correspondingly adjusted. With this system the operator will use only keys 87, 89, 90, 91, 92 and 94 and the first three of these keys will operate only upon controller bar 123 and thus withdraw only spacer block 118 and cause a two step advancement of the paper carriage, while the remaining three keys will operate upon controller bar 124 and thus serve to withdraw spacer blocks 118 and 119 and cause a three step advancement of the paper carriage.

To produce characters according to the "Regular Braille" system, the operator will depress key 131 and lock it in its depressed position, thus producing a uniform three space advancement of the paper carriage for each actuation of any character keys or space keys.

To produce characters according to the "Moon script" system, the operator will permit key 131 to return to its upper position and will depress key 86, thus preventing any spacing action as a result of the depression of the space key 153, (due to pawl 151 as already described) and thus prevent any movement of the carriage. This results in a holding of the carriage in position after the production of any vertical line or lines of characters so that a character of any desired horizontal dimension and three points high may be produced by successive actions of the character keys.

In order to produce a space between characters in this system either one of the keys 88 or 93 may be used as space keys.

I claim as my invention:

1. In a punctograph, the combination with a plurality of puncturing plungers, of a plurality of operating keys associated with the plungers, and means for varying the relation between the keys and plungers to adapt the machine for producing punctographic characters in accordance with different systems.

2. In a punctograph, the combination, with a plurality of puncturing plungers, of a plurality of operating keys therefor; and means for shifting the plungers relative to the keys to vary the coöperative relation thereof, for the purpose set forth.

3. In a punctograph, the combination with a plurality of puncturing plungers and a plurality of operating keys therefor, of a paper carriage, means for driving said paper carriage in one direction, spacing dogs controlling the movement of said carriage, a plurality of spacing blocks controlling the relative movement of the spacing dogs, a plurality of controlling bars connected with the spacing blocks, means carried by the plunger operating keys for engaging the controller bars, means for varying the relation between the operating keys and plungers, and means for correspondingly varying the relation between the controller bars and keys whereby the effect of the operating keys upon the carriage may be varied in accordance with the relation between the operating keys and the plunger.

4. In a punctograph, the combination with a plurality of plungers and a plurality of operating keys coöperating with said plungers, of a paper carriage arranged in conjunction with the plungers, means for driving said carriage in one direction, spacing dogs controlling the movement of said carriage, a plurality of spacing blocks coöperating with the spacing dogs to vary the action thereof relative to the carriage, a plurality of controller bars one for each spacing block and overlapping each other in one direction, intermediate connections between the several keys and certain of the spacing blocks, and means for shifting the controller bars relative to said intermediate connections to vary the relation between the operating keys and the spacing blocks.

5. In a punctograph, the combination with a plurality of plungers and a plurality of operating keys coöperating with said plungers, of a paper carriage arranged in conjunction with the plungers, means for driving said carriage in one direction, spacing dogs controlling the movement of said carriage, a plurality of spacing blocks coöperating with the spacing dogs to vary the action thereof relative to the carriage, a plurality of controller bars one for each spacing block and overlapping each other in one direction, intermediate connections between the several keys and certain of the spacing blocks, and means for permanently shifting one or more of initial ones of the spacing blocks to produce uniform movement of the carriage.

6. In a punctograph, the combination with a plurality of plungers and a plurality of operating keys coöperating with said plungers, of a paper carriage arranged in conjunction with the plungers, means for driving said carriage in one direction, spacing dogs controlling the movement of said carriage, a plurality of spacing blocks coöperating with the spacing dogs to vary the action thereof relative to the carriage, a plurality of controller bars one for each spacing block and overlapping each other in one direction, intermediate connections between the several keys and certain of the spacing blocks, means for shifting the controller bars relative to said intermediate connections to vary the relation between the operating keys and the spacing blocks and means for permanently shifting one or more of initial ones of the spacing blocks to produce uniform movement of the carriage.

7. In a punctograph, the combination with a plurality of plungers and a plurality of operating keys coöperating with said plungers, of a paper carriage arranged in conjunction with the plungers, means for driving said carriage in one direction, spacing dogs controlling the movement of said carriage, a plurality of spacing blocks coöperating with the spacing dogs to vary the action thereof relative to the carriage, a plurality of controller bars one for each spacing block and overlapping each other in one direction, intermediate connections between the several keys and certain of the spacing blocks, means for shifting the controller bars relative to said intermediate connections to vary the relation between the operating keys and the spacing blocks, and means for shifting the relation between the plungers and their operating keys to throw certain of the plungers into or out of operative connection with the keys.

8. In a punctograph, the combination with a perforated guide, having a plurality of perforations, a plurality of plungers having their ends mounted in said guide and their opposite ends mounted in a shifting guide, a plurality of operating keys arranged to engage the said opposite ends of said plungers, the said keys having limited engaging portions and means for shifting said shiftable guide plate to shift the plungers into and out of coactive relation with their keys.

9. In a punctograph, the combination, with the plungers and keys for operating the same, of a paper carriage coöperating with the plungers, and an indicator mounted upon the carriage and shiftable longitudinally thereof so as to be brought into coincidence with any erroneous character to facilitate its corrections and return to forming position relative to the plungers.

10. In a punctograph, the combination with suitable plungers and operating keys therefor, of a paper carriage, means for driving said paper carriage in one direction, spacing dogs controlling the movement of said carriage in that direction, a plurality of spacing blocks coöperating with the spacing dogs to control the movement thereof, a plurality of fingered controller bars each having one or more fingers corresponding with one or more of the operating keys and the fingers of the several controller bars overlapping each other in one direction whereby operation of each controller bar will serve to operate the controller bars adjacent one side but will not affect the controller bars adjacent the other side, and projections carried by the operating keys and overlapping the fingers of the controller bars.

11. In a punctograph, the combination with suitable plungers and operating keys therefor, of a paper carriage, means for driving said paper carriage in one direction, spacing dogs controlling the movement of said carriage in that direction, a plurality of spacing blocks coöperating with the spacing dogs to control the movement thereof, a plurality of fingered controller bars each having one or more fingers corresponding with one or more of the operating keys and the fingers of the several controller bars overlapping each other in one direction whereby operation of each controller bar will serve to operate the controller bars adjacent the other side, and projections carried by the operating keys and overlapping the fingers of the controller bars, and means for shifting said controller bars to withdraw or project the fingers thereof into coöperative relation with the projections on the operating keys.

12. In a punctograph, the combination, with a plurality of similar character-forming plungers arranged to be operated singly or conjunctively and the paper carriage coöperating therewith, of means for driving said paper carriage in one direction, multiple-spacing mechanism coöperating with the carriage to normally permit an initial spacing step and also additional spacing steps, and means acting on the spacing mechanism for producing or eliminating one spacing action of the spacing mechanism.

In witness whereof, I have hereunto set my hand and seal at Indianapolis, Indiana, this fifteenth day of July, A. D. one thousand nine hundred and nine.

ALBERT SWINDLER. [L. s.]

Witnesses:
    JOHN LEES,
    ARTHUR M. HOOD.